Patented Apr. 30, 1946

2,399,411

UNITED STATES PATENT OFFICE 2,399,411

MASTIC COMPOSITIONS

Vilas E. Watts and Paul E. McCoy, San Francisco, Calif., assignors to American Bitumals Company, San Francisco, Calif., a corporation of Delaware No Drawing. Application November 16, 1942, Serial No. 465,800

18 Claims. (Cl. 106—104)

This invention relates to new and useful compositions of matter, more particularly to a setting composition for bituminous mastics and to mastics prepared therewith and the method of preparing them.

Asphalt and other similar bituminous substances possess well recognized properties which adapt them as constituents of cement or mastics for paving, flooring compositions, molded articles, waterproofing compounds, and the like. Thus molten asphalt mixed with mineral dust, sand and gravel or stone chips has considerable application as a mastic flooring composition. Asphalt floors thus made are warm under foot, tough, resilient, free from dust and therefore cleaner than concrete, and, since they can be dented but not chipped like concrete or stone floors, they are more easily maintained than the latter.

Hot mastic-type asphalt floorings and the like have, however, certain disadvantages. As stated, the asphalt is melted and mixed with aggregate. This necessitates a central heating plant to melt the asphalt, and sometimes to heat the aggregate. It is, therefore, difficult or not feasible to transport the heated materials very far from the central heating plant, and, moreover, the presence of such a heating plant creates a fire hazard in confined places in close proximity to combustible material, as below deck aboard ships. Also, the hot mastic cools so quickly that it is extremely difficult and often impossible to obtain a perfectly smooth floor or other surface free from corrugations; that is, the mastic sets quickly to an uneven surface before it can be smoothed out.

In more recent times, with the advent of emulsified asphalt, there has been developed the use of mastics which can be applied cold. These "cold-lay" mastics consist principally of asphalt or other bituminous emulsion, aggregate and a substance which brings about setting of the mastic. Usually the aggregate and setting agent are mixed, asphalt or the like is added to the mixture, water in addition to that present in the emulsion is added if need be to bring the mixture to proper troweling consistency, and the mixture is applied as a flooring composition or otherwise. Portland cement is commonly used as the setting agent in these cold-lay mastics.

Such mastics have the advantage that they can be mixed, laid and finished at room temperature and therefore are more convenient to handle than the hot mastics. However, they are in general slow in setting, requiring from 24 to 48 hours to set sufficiently to sustain foot traffic and 72 to 96 hours to set sufficiently to sustain light trucking. The cold-lay mastics also suffer from the disadvantage that the strength of the set mastic is governed by the temperature and humidity conditions prevailing during the setting period. Many such mastics made using Portland cement as the setting agent have proved unsatisfactory for these and other reasons.

To obviate these difficulties various substitutes for Portland cement have been offered to the trade. One such substitute is proposed in United States Patent No. 1,901,055 to Harry K. Linzell, dated March 14, 1933, wherein there is set forth an improvement in the art of mastics made from bituminous emulsions, such improvement involving the use of "alpha gypsum" as the setting ingredient or agent. As set forth in said patent, and also in United States Patent No. 1,901,051 to Randel and Dailey, alpha gypsum is prepared by calcining ordinary gypsum ($CaSO_4 \cdot 2H_2O$) in the presence of steam at a pressure of 15 to 50 pounds, preferably 17 to 20 pounds, per square inch gage, for 5 to 7 hours, meanwhile constantly removing water of condensation. Following the calcination, the product is dried and ground so that 85% or more passes through a 100-mesh screen. This alpha gypsum, as set forth in said patents, is much higher in compressive and tensile strengths than plaster of Paris, being like Portland cement in this respect, whereas it sets quickly, viz. in 15 to 30 minutes, like plaster of Paris. Its compressive strength is from 2500 to 5750 pounds per square inch and its pouring consistency is 50 cc. per 100 grams of stucco, compared with a compressive strength of 1200 to 2500 pounds per square inch and a pouring consistency of 52 to 96 cc. per 100 grams of stucco for plaster of Paris. Also, crystals of this alpha gypsum, when observed under crossed nicols in a petrographic microscope, are said to appear rather short, thick and well formed and brilliantly colored. Chemically the alpha gypsum is distinguished from ordinary plaster of Paris by being a purer calcium sulfate hemihydrate ($CaSO_4 \cdot \frac{1}{2}H_2O$)

In United States Patents Nos. 1,931,240 (Randel and Dailey) and 1,979,704 (Randel, Dailey and McNeil) other methods of manufacturing alpha gypsum are described.

Alpha gypsum, however, suffers from certain disadvantages as a setting agent for asphalt mastics and the like. Thus, mastics made with it as the sole setting agent are brittle and cannot sustain suddenly applied loads. Upon the impact of a falling weight such mastics are shattered and cracked. Cracks so formed are not self-annealing, since the mastic is lacking in toughness and resilience. Also, mastics made from alpha gypsum suffer from the fact that they tend to be brown in color rather than black and, therefore, do not satisfy the demand of the trade for mastics of a rich, black color.

It is an object achieved by the present invention to produce a superior type of setting agent for mastics of the cold-lay type.

It is another object achieved by the present invention to provide asphalt mastics and the like of the cold-lay type which set quickly to produce superior floorings, patchwork, and the like.

It is a particular object achieved by the present invention to provide asphalt mastics and the like of the cold-lay type which set quickly to produce a tough, resilient, substantially non-shrinking and non-cracking surface of rich black color.

Other objects achieved by the present invention will be apparent from the description and the appended claims.

We have found that mastics of greatly improved characteristics can be made by using as the setting agent a mixture of alpha gypsum or other high-strength, quick-setting forms of calcined gypsum and a high-alumina cement of the type represented by Lumnite cement.

Lumnite cement is defined in "Johnson's Materials of Construction," 7th edition, page 358 (John Wiley and Sons), as an hydraulic cement consisting essentially of alumina ($Al_2O_3$) 40.0, lime (CaO) 40.0, iron oxides 15.0, and silica, magnesia, insoluble material, etc., 5.0 per cent. It is stated by Johnson to be manufactured from limestone and bauxite, either by the dry process used in making Portland cement or by fusion in an electric furnace, and to be much darker colored than Portland cement.

We have found that by using Lumnite cement along with alpha gypsum greatly and unexpectedly improved results are obtained. This invention, however, is not limited to the specific commercial products hereinabove identified, although they are preferred, but it includes the production and employment of mixtures of high-alumina, high early strength cements (so-called aluminous cements) and high strength, quick-setting calcined gypsums.

It has been found that mastics prepared from mixtures of such high-alumina cement and high strength, quick-setting calcined gypsum, together with asphalt emulsion and aggregate, set quickly, sustain foot traffic in less than six hours under almost any conditions of temperature and humidity, and sustain heavy traffic in 12 to 24 hours. The mastic so formed is not only hard and tough but also has superior troweling qualities when freshly made, sets very rapidly, exhibits practically no shrinkage upon and after setting, possesses a very high compressive strength, is highly resistant to sudden shock as by impact of a falling weight, and has a rich, uniform black color.

In the high-alumina cement-alpha gypsum mixtures of this invention, the proportions of ingredients may vary from 1 part or less to 20 parts or more by volume of the cement to one part by volume of the alpha gypsum although mixtures containing about 2 to 10 parts by volume of the cement per part by volume of alpha gypsum are preferred. There may also be incorporated in the setting mixture small amounts of set-retarding or expansion controlling agents, such as hydrated lime, Portland cement or other agents known to the art, although generally these will be found unnecessary.

The asphalt or other bituminous emulsions used with the said setting mixture are preferably of the stable mixing type. They may be stabilized by any of a variety of stabilizing agents, notably "Vinsol" resin (a product of the Hercules Powder Company obtained by improved methods from the wood of Southern long leaf pine, and described and claimed as a stabilizing agent for bituminous emulsions in Buckley, United States Patent No. 2,256,886); also "Meadol," which is a purified lignin product of The Mead Corporation and which is described in Industrial and Engineering Chemistry, vol. 32, pages 1399-1400 (1940). Clay-type stabilizers, such as bentonite clay, may also be used to stabilize bituminous emulsions for use in the practice of the present invention, as may still other types of stabilizer or dispersing agent.

Besides asphalt, other bituminous products and indeed non-bituminous, water-insoluble but water-dispersible substances such as natural and synthetic resins, waxes, and synthetic rubber may be employed in making flooring mastics, waterproofing material, molded articles and the like in accordance with the invention.

The selection of aggregate will depend upon the requirements of a particular job and the types of aggregate available. Usually sand will be used, also gravel where permissible or where desirable for heavy duty floorings and the like. In certain cases, however, it may be desirable to omit the aggregate altogether. Also, there may be incorporated in the mix various other materials such as sawdust, cork dust, talc, asbestos, pigments and the like.

Usually it will be necessary or desirable to add water, in addition to that present in the emulsion, to bring the mix to a suitable pouring and troweling consistency.

The proportions of the various ingredients of the mastic compositions of the present invention will vary from job to job. For purposes of guidance and illustration, however, the following formulae are provided:

(1) *For light duty flooring*

|  | Parts |
|---|---|
| Asphalt emulsion | 1½ to 2 |
| Mastic setting powder | 1 |
| Graded concrete-typed sand | 3-4 |

(2) *For heavy duty flooring*

|  | Parts |
|---|---|
| Asphalt emulsion | 1½ to 2 |
| Mastic setting powder | 1 |
| Sand | ½-1 |
| Rock chips through ⅜" sieve and on No. 10 sieve | 3-4 |

(3) *For molded articles*

|  | Parts |
|---|---|
| Asphalt emulsion | 1½ to 2 |
| Mastic setting powder | 1 |
| 80 mesh silica | 2 |
| Chromium oxide | ½ |

(4) *For insulation work*

|  | Parts |
|---|---|
| Asphant emulsion | 1½ to 2 |
| Mastic setting powder | 1 |
| Vermiculate of concrete aggregate size | 4-5 |

In the above formulae, all parts are by volume. Also, it is intended that in each case such water as may be desired, in addition to that contained in the asphalt emulsion, will be added to the mix to bring it to the proper troweling consistency. The "mastic setting powder" referred to in the above formulae is the setting powder of the invention, preferably containing about 3 parts Lumnite cement and 1 part alpha gypsum by volume. The asphalt emulsion may comprise about equal parts by weight of asphalt and dilute aqueous NaOH solution.

Usually, the setting mixture of the invention (high alumina cement and alpha gypsum or the like) will be dry mixed with aggregate, the dry mix dampened, bituminous emulsion added thereto and mixed in, and sufficient water added to bring to the desired consistency. However, the high alumina cement and alpha gysum may be added separately, and other variations within the scope of the invention will be apparent to those skilled in the art.

The following specific examples will serve to illustrate the practice and advantages of the invention:

Example 1.—Various mastics were made as follows: 1 part by volume of setting powder was mixed with 3½ parts by volume of sand and the mixture was then mixed with 1½ parts by volume of asphalt emulsion. The asphalt emulsion was composed of 43 parts by weight of 0.32 per cent aqueous NaOH solution, 55 parts by weight of asphalt and 1.68 parts by weight of "Vinsol" resin as an emulsion stabilizer. Three different setting powders were used, as follows:

A. 100% Hydrocal A-13
B. 100% Portland cement
C. 20% Hydrocal A-13 + 80% Lumnite cement
(Percentages by weight.)

The only variation in procedure in producing these various mastics was in the setting powder used. The following results were noted:

Table I

| Setting powder | A | B | C |
|---|---|---|---|
| Relative water required for mixing | 1 | 1.07 | 0.57. |
| Handling properties | Smooth, easy troweling. | Smooth and easy to handle. | Plastic mix. Good troweling. |
| Time for set to sustain light foot traffic | 6 hrs | 24 hrs | 3½ hrs. |
| Final set to sustain light trucking | 24 hrs | 72 hrs | 6 hrs. |
| Shrinkage | None | Slight | Negligible. |
| Indentation after 72 hrs.[1] | 1.25" | 1.05" | 0.62". |
| Color | Dark brown | Dark brown | Rich black color. |

[1] The indentation test consisted of resting a 150-pound load on a 2-inch diameter steel ball on the mastic after it had set for 72 hours and measuring the diameter of the indentation after 2 minutes of loading.

The "Hydrocal A-13" of Example 1 and subsequent examples is the trade name of a product of the United States Gypsum Company and it is a form of alpha gypsum. Another form of alpha gypsum is sold by the United States Gypsum Company under the trade name "Mastical."

Example 2.—Mastics were made using "Hydrocal A-13" and Lumnite cement in varying proportions and using "Vinsol" resin and "Meadol" as emulsion stabilizers. In all cases the emulsion was an emulsion of asphalt in aqueous caustic soda solution, the emulsion containing 55 per cent by weight of asphalt based on the emulsion. These mastics were tested as set forth in Example 1. The compositions of the mastics and the test results are given in Table II below.

Table II

| | 1 | 2 | 3 | 4 |
|---|---|---|---|---|
| Emulsion ............ parts by volume | 1½ | 1½ | 1½ | 1½ |
| Lumnite cement ................... do | ¾ | ½ | ¾ | ¾ |
| Hydrocal A-13 ................... do | ¼ | ½ | ¼ | ¼ |
| Rock chips ........................ do | 4 | 4 | 4 | 0 |
| Sand ............................... do | ½ | ½ | ½ | 3½ |
| Water ............................. do | ¼ | ¼ | ½ | ⅛ |
| Mixing qualities | Very plastic | Very plastic | Plastic | Very plastic |
| Troweling qualities | Excellent | Excellent | Smooth | Excellent |
| Time for set to sustain foot traffic | 4 hrs. | 4 hrs. | 4 hrs. | 4 hrs. |
| Time for set to sustain light trucking | 18 hrs. | 18 hrs. | 18 hrs. | 18 hrs. |
| Ball indentation in 72 hrs | 0.6" | 0.65" | 0.5" | 0.6" |
| Color | Black | Black | Black | Black |

All of the emulsions except No. 3 contained 1.7 per cent by weight of "Vinsol" resin as a stabilizer. Emulsion No. 3 contained 1.2 per cent by weight of "Meadol" as stabilizer.

Example 3.—A mastic was formed in the usual way from 1½ parts by volume of asphalt emulsion, 1 part by volume of a setting powder (formed of 3 parts by volume of Lumnite cement and 1 part by weight of Hydrocal A-13) and 3 parts by volume of graded concrete sand. Water was added sufficient to bring the mix to a convenient troweling consistency. This mastic was used to leak-proof a large tank used for storage of asphalt. The tank was of bolted sheet construction with the joints sealed by a rubber gasket placed between the seams. In use the tank had developed leakage and to obviate the same the tank was emptied and the foregoing mastic was applied over the seams. The mastic coating was observed to dry rapidly and was fit for use in 18 hours. The seal was perfect. Subsequent inspection of the tank revealed no cracks and perfect adherence of the mastic to the metal walls of the tank despite the fact that asphalt contained in the tank ranged in temperature from atmospheric to 300° F.

By increasing the proportion of Lumnite cement relative to alpha gypsum, greater toughness, quicker setting and blacker color may be developed, whereas by increasing the proportion of alpha gypsum, greater hardness and brittleness and slower setting qualities may be developed.

An outstanding advantage of the mastics of the present invention is that they set rapidly even under very adverse conditions, such as temperatures of 32° F. and high humidity.

The mastics of the present invention may be employed for new floorings, patching old floors, refacing concrete flumes, dams and the like, filling cracks, damp proofing concrete walls, water proofing steel vessels, etc.

We claim:

1. A composition of matter, adapted to function as a setting agent for mastics formed from aqueous bituminous emulsion and aggregate, comprising above 1 and not more than about 20 parts by volume of aluminous cement and one part by volume of alpha gypsum.

2. A composition of matter, adapted to function as a setting agent for mastics formed from aqueous bituminous emulsion and aggregate, comprising about 2 to 10 parts by volume of aluminous cement and one part by volume of alpha gypsum.

3. A setting agent consisting substantially of 2 to 10 parts by volume of Lumnite cement and about one part by volume of alpha gypsum.

4. A mastic-type composition, formed of substantial amounts each of aluminous cement, alpha gypsum and an aqueous oil-in-water type emulsion of an organic substance selected from the group consisting of bitumens, waxes and resins.

5. A mastic-type composition, formed of substantial amounts each of aggregate, aluminous cement, alpha gypsum and an aqueous oil-in-water type emulsion of an organic substance selected from the group consisting of bitumens, waxes and resins.

6. The composition of claim 5, wherein said organic substance is a bitumen.

7. The composition of claim 5, wherein said organic substance is asphalt.

8. A hard, resilient mastic adapted for flooring and the like, formed of substantial proportions each of: an aqueous asphaltic emulsion stabilized with Vinsol resin; aggregate; and a mixture of about 1 to 20 parts by volume of Lumnite cement to one part by volume of alpha gypsum.

9. The mastic of claim 8, where said alpha gypsum is "Mastical."

10. In the method of preparing mastic-like compositions adapted to be laid cold wherein a bituminous emulsion is mixed with a setting agent, the improvement which comprises mixing the bituminous emulsion with aluminous cement and alpha gypsum as the setting agent.

11. The improvement of claim 10, wherein said cement is Lumnite cement.

12. In the method of preparing mastics wherein a bituminous emulsion, aggregate, a setting agent and water in quantity sufficient to bring the mix to a suitable pouring and troweling consistency are commingled, the improvement which comprises incorporating in the mix Lumnite cement and alpha gypsum as the setting agent.

13. Improvement of claim 12, wherein said bituminous emulsion is an asphaltic emulsion.

14. In the method of preparing mastics wherein an asphalt emulsion stabilized with Vinsol resin, aggregate, a setting agent and sufficient water to bring the mix to a suitable pouring and troweling consistency are commingled, the improvement which comprises incorporating in the mix Lumnite cement and "Mastical" as the setting agent.

15. A hard, resilient mastic adapted for flooring and the like, formed of substantial proportions each of: an aqueous asphaltic emulsion stabilized with "Meadol," aggregate and a mixture of about 1 to 20 parts by volume of Lumnite cement to one part by volume of alpha gypsum.

16. A hard, resilient mastic adapted for flooring and the like, formed of substantial proportions each of: an aqueous asphaltic emulsion stabilized with clay, aggregate and a mixture of about 1 to 20 parts by volume of Lumnite cement to one part by volume of alpha gypsum.

17. In the method of preparing mastics wherein an asphalt emulsion stabilized with "Meadol," aggregate, a setting agent and sufficient water to bring the mix to a suitable pouring and troweling consistency are commingled, the improvement which comprises incorporating in the mix Lumnite cement and "Mastical" as the setting agent.

18. In the method of preparing mastics wherein an asphalt emulsion stabilized with clay, aggregate, a setting agent and sufficient water to bring the mix to a suitable pouring and troweling consistency are commingled, the improvement which comprises incorporating in the mix Lumnite cement and "Mastical" as the setting agent.

VILAS E. WATTS.
PAUL E. McCOY.